FREDERICK H. BEACH &
VINCENT Di RUBBIO
INVENTORS

THEIR ATTORNEYS

FREDERICK H. BEACH &
VINCENT Di RUBBIO
        INVENTORS

THEIR ATTORNEYS

May 31, 1966   F. H. BEACH ETAL   3,253,496
METHOD AND APPARATUS FOR LOADING PARTICULATE MATERIAL
INTO RECEPTACLES
Filed March 25, 1955   4 Sheets-Sheet 4

FREDERICK H. BEACH &
VINCENT Di RUBBIO
INVENTORS

BY Connolly and Hutz

THEIR ATTORNEYS

United States Patent Office 3,253,496
Patented May 31, 1966

3,253,496
METHOD AND APPARATUS FOR LOADING PARTICULATE MATERIAL INTO RECEPTACLES
Frederick H. Beach and Vincent Di Rubbio, North East, Md., assignors to Ordnance Products, Inc., North East, Md., a corporation of Delaware
Filed Mar. 25, 1955, Ser. No. 496,662
19 Claims. (Cl. 86—32)

The present invention relates to the loading of particulate material into receptacles.

Among the objects of the present invention is the provision of novel apparatus and methods for effecting such loading.

The above as well as further objects of the present invention will be more clearly understood from the following description of several of its exemplifications, reference being made to the accompanying drawings wherein.

Figure 1:
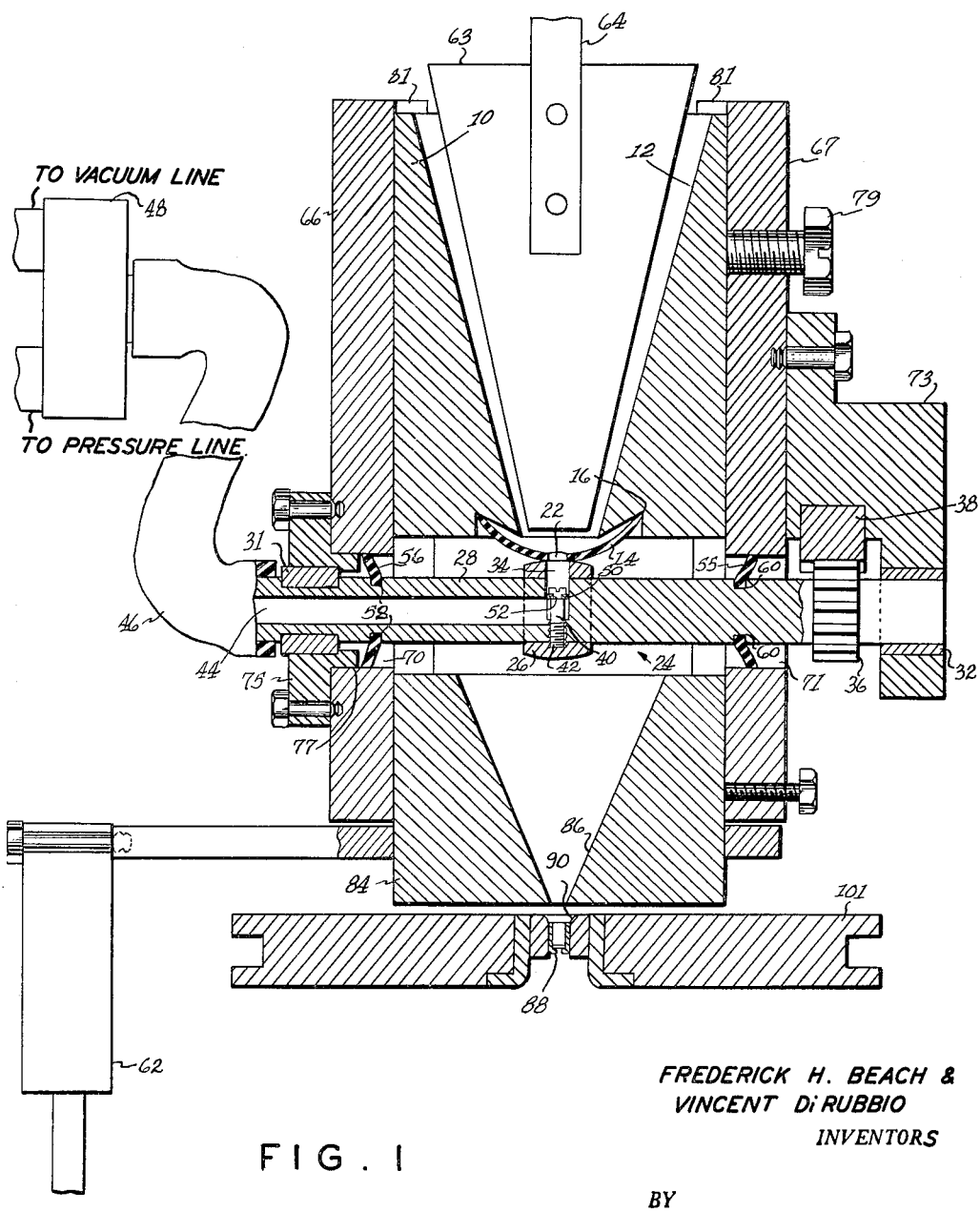
FIG. 1 is a sectional view of a loading unit embodying the present invention.

It has been discovered that extremely effective loading of particulate material can be effected with a holder for the particles where the holder has a resilient resinous generally hopper-shaped bottom with an aperture at its lower portion, a metering member having an elongated smooth surface is pressed upward against the apertured portion of the bottom and deforms that portion upwardly, said surface has a metering pocket and is in slidable engagement with the apertured surface, and actuating mechanism is connected to move the pocket under the aperture to receive some of the material from the holder, said mechanism being also connected to slide the pocketed surface along the apertured portion so as to bring the pocket away from the aperture into position for emptying the received material into a desired receptacle.

The pocket is desirably provided with a porous wall communicating with a controllable source of gas under a pressure other than atmospheric, and the actuating mechanism can then be further connected to control the source and apply the pressure to assist with the loading.

For automatic operation the actuating mechanism further includes a stepping device connected to bring receptacles under the emptying position in synchronism with the sliding of the pocketed surface into the emptying position. The stepping device preferably has a plurality of blocks mounted for sliding on a trackway, and a propelling bar connected in one location to intermittently push a contiguous series of blocks along the trackway.

Referring now to the drawings:

FIG. 1 shows a loading unit having a holder 10 for the particulate material or powder to be loaded. The holder 10 is in the form of a block having a conically tapering passageway 12 in which the material is placed, and which acts as a supply reservoir. At the lower end of the passageway, a hopper-shaped bottom is provided in the form of a resilient or rubbery cup 14. This cup is readily provided by taking a circular disc of resilient rubbery material having an appropriate diameter larger than the mounting space 16 provided in block 10, and wedging it in place. This wedging causes the disc to shape itself into convex form approximating a cone or a segment of a sphere. If desired, the disc 14 can be pre-molded into the desired convex shape and merely slipped in place, or molded somewhat oversize so that it frictionally holds itself against the walls of space 16.

The cupped disc 14 has a central aperture 22 through which the particulate material or powder is loaded from the reservoir 12. The apertured portion of the cup is deformed upwardly by a metering member 24 shown as a ring 26 secured, as by soldering, welding, cementing, etc., on a shaft 28 rotatably mounted in bearings 31, 32. A metering pocket 34 is drilled through the ring as well as into the shaft in one portion of the metering member. Rotation of the shaft is provided by a pinion gear 36 that meshes with a slidable rack gear 38 so as to move the pocket 34 into position under the aperture 22 as well as to move it away to another position where the contents of pocket 34 can be emptied. The pocket can be made of adjustable size by providing it with a movable floor 40 shown in the form of a screw threaded to engage a threaded portion 42 at the bottom of the pocket. The top of the screw can be slotted as indicated so that the blade of a screwdriver inserted in the slot can be used to rotate the screw and thereby elevate or lower it.

Filling and emptying of the pocket is greatly facilitated by connecting the pocket as by a longitudinal bore 44 in shaft 28 to a source of air at a pressure other than atmospheric. In the figure the source is represented by a flexible tubing 46 connected to valve 48 having vacuum and pressure line connections. To assist the air pressure, the screw 40 is shown as having a head somewhat loosely fitted in the pocket, a porous gasket 50 such as felt being held between the screw and pocket walls to prevent the passage of powder and yet permit movement of air from the pocket to the bore 44. To assist in holding the gasket in place, the screw can have a positioning groove 52 at or adjacent its head.

It is also helpful to seal the space around the pocket and the cup against leakage as by disc-like rubber seals 55, 56 squeezed in place in suitably provided grooves 58, 60, in shaft 28. These seals press against the walls of openings 70, 71 through which the shaft 28 passes.

The metering member, including shaft 28, can be held in place between side walls 66, 67, and can be inserted through aligned openings 70, 71. Bearing 32 can be of the outrigger type held on an offset fitting 73 fastened against side wall 67, and grooved to receive rack gear 38. The other shaft bearing 31 is shown as held in a collar 75 bolted to side wall 66 and having a cylindrical extension 77 fitted in opening 70. The shaft can be kept from longitudinal movement as by having one of the bearings engaged in a mating bearing groove around the periphery of the shaft, as indicated at bearing 31. The bearing 31 can be formed of split halves so that it will fit in place.

A feature of the invention is that extremely good wiping contact is established between the apertured portion of cup 14 and the surface of the metering ring 26. The upward deformation of the apertured portion should extend at least to the edge of aperture 22. The shape of the surface of ring 26 where it engages the apertured portion of the cup 14 can either be spherical, as indicated in FIG. 1, cylindrical, or generally convex. If desired, the upwardly deformed section of the cup can be pre-molded with a degree of upward deformation less than that produced by contact with the metering surface.

For ease of adjustment, the block 10 can be slidably engaged between side walls 66, 67, and can be held fixed in any desired position as by means of the clamping bolt 79. For alignment purposes each of the side walls have a pair of wings 81 defining a channel in which the block 10 can be slid. The walls themselves are suitably secured to each other in any convenient fashion.

Below the metering assembly the construction of FIG. 1 has a funneling block 84 that can also be held between the side walls and which provides a tapered passageway 86 through which the powder emptied by the metering mechanism is dropped. Where the powder does not flow through the funneling block too readily, agitating mechanism such as supplemental air jets or a vibrator as shown at 62 can be connected to the block. The vibrator is conveniently operated by compressed air as illustrated, or can be mechanically actuated, while the emptying is taking place.

The vibration also helps the powder flow through hopper 12–14. However, it may also be helpful to provide supplemental air passageways in the sides of block 10 through which air jets can be passed into the hopper's contents. These air jets can be directed radially, tangentially and/or inclined upwardly or downwardly to assist in moving the powder. Air jets can also be introduced through a tube inserted in the hopper from above.

Another suitable form of agitating mechanism is a stirring paddle 63 shown as rotatably mounted on a shaft 64. This paddle can be rotated either continuously or only when the pocket 34 is in the filling position.

The containers in which the powder is to be loaded are placed under the funneling block. Such a container is illustrated at 88 as a small tube fitted in a socket 90 centrally positioned in a holding disc 101.

The apparatus of FIG. 1 is operated by pouring some of the powder to be loaded in the reservoir 12 and then rotating or oscillating shaft 28. When the movement of the shaft brings pocket 34 under aperture 22, some of the powder will drop into and fill the pocket. The sliding action against the disc 14 will hold all superfluous powder in or above the aperture 22 while the metering member is rotated away from the holding position. When the rotation is carried far enough to tip the pocket downwardly, its contents will drop into the funneling hopper and from there into the receptacle 88. A repetition of the above steps will deliver a second small load of powder which can be placed in the same or a different receptacle.

Best results and the greatest accuracy is obtained when air pressure is used to assist in the loading operation. Thus, when the metering pocket is brought under the aperture 22, a momentary application of vacuum by valve 48, which can be synchronized with the rack 38, will cause the powder to be firmly sucked into the pocket and neatly packed in place therein. When the pocket is rotated to the discharging position, a momentary application of superatmospheric pressure through the same synchronized valve 48 will accurately empty the contents of the pocket. This is particularly effective with the finer powders, that is, those that have particles smaller than about 250 mesh and are not sufficiently dense to pour readily. However, suction can be used by itself or superatmospheric pressure by itself to also give good results, even with such fine powder.

The loading device of FIG. 1 can be used to accurately meter and load quantities of powder of any kind. It is particularly suited, however, to load materials, such as explosive powder, which are sensitive to friction. It appears that the engagement between the deformed hopper bottom 14 and the metering ring 26 is such that the flow of even the most sensitive explosive powder can be controlled without any difficulty. For example, the supersensitive detonator mixture having the following formulation in parts by weight:

| | |
|---|---|
| Potassium chlorate | ⅓ |
| Antimony trisulfide | ⅓ |
| Lead azide | .283 |
| Carborundum | .05 | is very effectively loaded with the apparatus of FIG. 1 with an exceedingly low incidence of explosions taking place. As a safety precaution, the reservoir 12 should, in the event such sensitive material is used, be filled with a quantity on greater than about 15 to 20 grams inasmuch as such quantities, when detonated, will not do any appreciable harm. Also, for handling such explosive materials, the portions of the apparatus should be made as sturdy as possible so that an occasional explosion will not damage the apparatus itself.

Other explosive materials that are safely handled by the above apparatus include supersensitive lead styphnate formulations as well as lead azide or lead styphnate themselves, black powder, nitrocellulose, perchlorates, peroxides, aluminum or magnesium powders, etc. The various materials such as the metering member and the resilient resinous cup 14, and even the surfaces of blocks 12 and 84 that come into contact with the powder, should be relatively inert to the powder so that no reaction takes place when they contact each other. One very suitable material for the construction of the rigid members such as the blocks and metering assemblies, is 18–8 stainless steel, particularly for the handling of explosive powders. However, other metals such as aluminum, brass, copper and even ordinary cold-rolled SAE 1010 steel are also suitable where they are sufficiently non-reactive. Stainless steel is also desirable because it is relatively hard and accordingly less easily abraded as by powders that are of abrasive nature or include abrasive ingredients. Other abrasion-resistant metals such as chromium or chromium-plated steels, or even chromium-plated aluminum, can also be used in such connection. A surface hardness of at least about C–35 on the Rockwell scale is preferred. For the maximum inertness the exposed surfaces of metals can be plated with gold, silver, or similar non-reactive coatings.

Although the metal constructions will generally best withstand explosions, some or all of the rigid members can be made of other materials such as graphite or resins including those of the phenol-aldehyde, furan, epoxy, alkyd or vinyl types. Even glass or glazed ceramics can similarly be used.

The resilient resinous cup 14 can be made of rubber, as pointed out above, either natural or synthetic. Examples of synthetic rubbers are styrene-butadiene copolymers, isoprene polymers, neoprene, acrylonitrile-butadiene copolymers, etc. It can also be made of any other resilient resinous material, including elastomers of the acrylonitrile type or even of polytetrafluoroethylene or polytrifluoromonochloroethylene.

Figure 2:
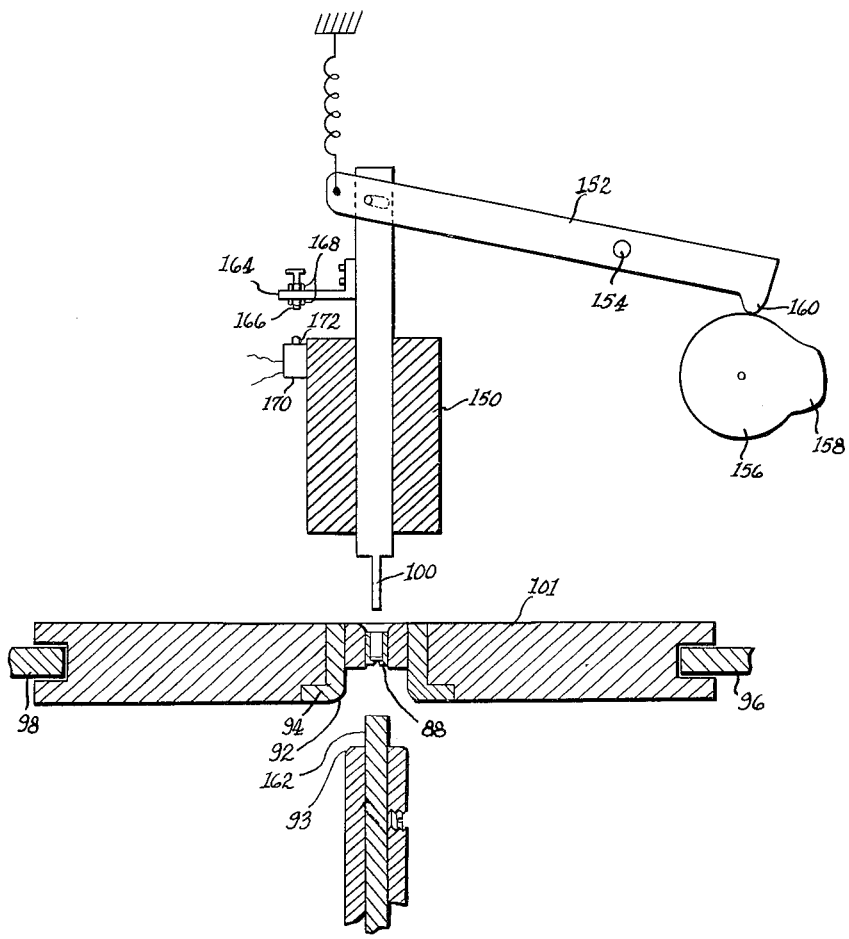
FIG. 2 is a similar view of a compacting unit according to the present invention that can be used with the loading unit.

In powder-loading operations it is generally desirable to include some tamping or compacting step. This is particularly true of explosives. FIG. 2 shows a form of compacting apparatus that can be used with the loading assembly of FIG. 1. In FIG. 2 the holding disc 101 is shown engaged in positioning rails 96, 98. Above the center of the disc there is positioned a first plunger 100 slidably held in an encircling guide 150 suitably fixed in place. The plunger is in turn connected as by the pin-and-slot connection shown, to an operative lever 152 pivoted as at 154 and actuated by a cam 156 having a lobe 158 which engages with a cam follower 160 formed on the lever. The receptacle 88 carrying the load of powder is located so that the projecting end of plunger 100 will, on descending, enter the top of the receptacle and engage the powder in it.

Another plunger 162 is shown as similarly positioned below the receptacle and can also be actuated upwardly to fix the position for the bottom of the receptacle when the upper plunger descends. For assisting in the alignment, the lower portion of the socket can be flared, as indicated at 92, to engage a tapered shoulder 93 on the lower plunger. This will cause a misaligned block to be brought over to the center position when plunger 162 is elevated. Plungers 100 and 162 are carefully aligned in the construction of the apparatus so that plunger 162, by being elevated first, will make sure that the receptacle is properly aligned to receive the plunger 100. The flared walls 92 can be formed of wear-resistant material such as steel, which can be formed as an insert 94 in the block 101. The remainder of the block can be of softer material such as aluminum, brass, magnesium or resin, particularly if it is desired to minimize the detonation of stray particles of explosive powder that may spill on the block or on the trackway.

The compactor of FIG. 2 is shown as also provided with an automatic warning attachment to indicate when the proper amount of powder is not present in the receptacle. An adjustable height indicator 164 is fastened to plunger 100 and carries a nose 166 adjustably held in place as by locking nuts 168. A circuit operating switch 170 such as a micro switch, having an operating button 172, is fastened to guide 150 in such position as to be engaged by nose 166 if it descends too far, as when the amount of powder in the receptacle 88 is insufficient or the compacting pressure is excessive. Such engagement will cause the button to trip the switch 170 and the switch can be connected in a circuit that gives suitable warning, as by automatically shutting off the energization of the compactor and/or by lighting an electric bulb. Two or more compacting units can be operated in the same location and in such arrangements each can have a warning device that gives a distinctively different indication. In the event that the compacting of an explosive causes it to detonate, as may sometimes happen, the resulting explosion will convert the powder essentially to gas so that the plunger 100 will drop down too far and actuate the switch.

If desired, two such switches 170 can be provided, each coacting with a different actuator and at different levels, representing the minimum and maximum tolerance of the loading. The warning circuit can then be arranged so that it will be kept out of operation when the maximum height switch is actuated and the minimum height switch is not actuated. Failure to actuate the maximum height switch, or actuation of the minimum height switch will then be arranged to give the warning. Other forms of warning systems can also be used.

The compacting can be performed either with the cam and lever action shown in FIG. 2, or by pneumatic or hydraulic cylinders or solenoids or the like. However, it is preferred, particularly where explosives are concerned, to begin the compacting with a plunger moving at a relatively slow rate, and to end the compacting at a slower rate. The intervening portion of the compacting can be effected at a somewhat faster rate in the interest of efficiency. Furthermore, greater accuracy and reproducibility is obtained if the maximum compactness is maintained for a dwell at least a half second long, and as long as practicable. Such variations in plunger travel are readily provided by suitably shaping the operating lobe of cam 156. In addition, some advantages can be obtained by having the plunger spring-actuated to compacting engagement, with the cam or other control merely used to retract the plunger instead of having the spring do the retracting, as in FIG. 2. When the spring does the compacting actuation, it will automatically limit the maximum compacting force that can be applied. A similar effect can be obtained by inserting a spring connection in the positive drive linkage of FIG. 2 as by dividing the plunger into two longitudinally spaced portions and inserting a force-limiting spring between them.

Figure 3:
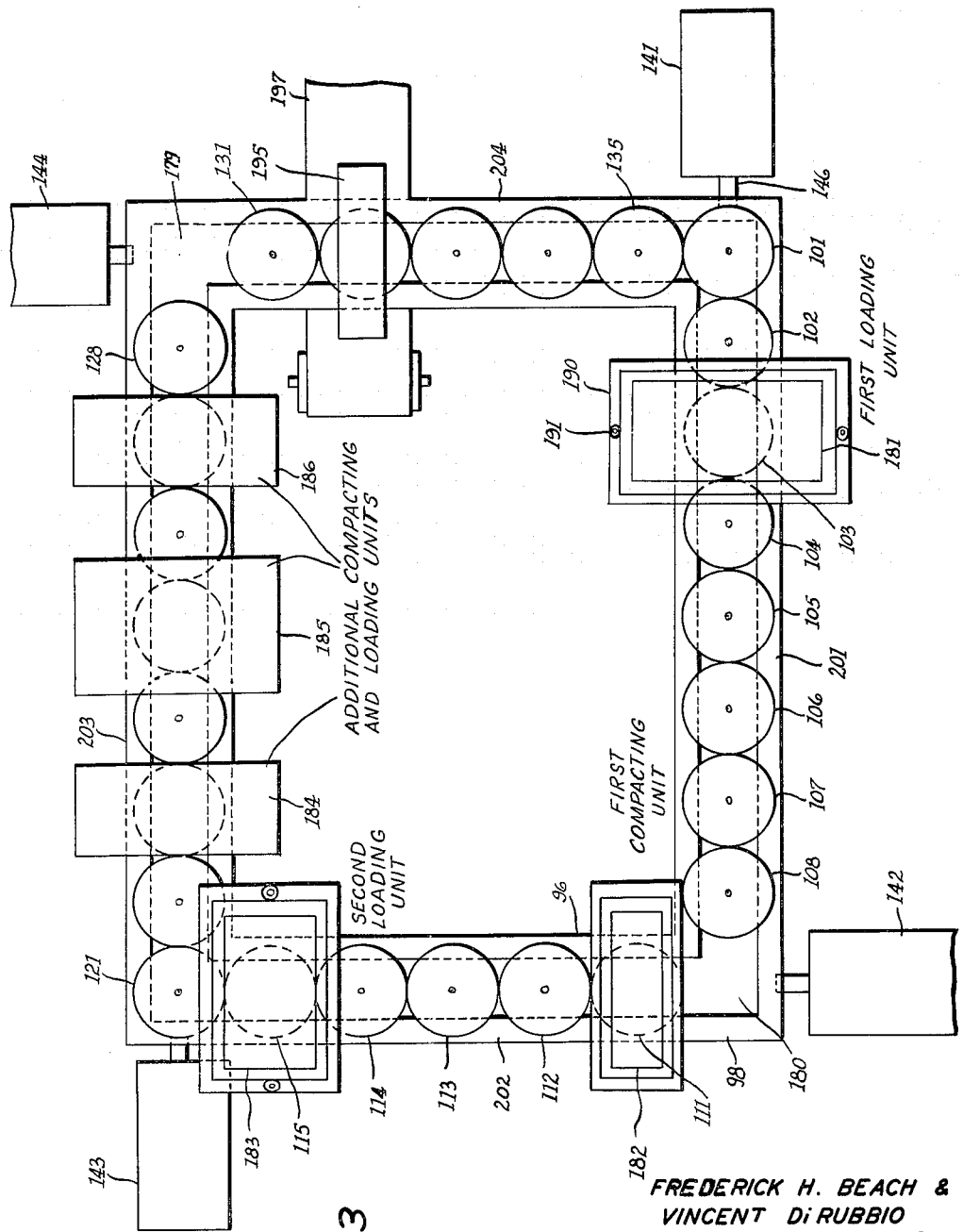
FIG. 3 is a somewhat diagrammatic plan view of the essential elements of an automatic loading machine exemplifying the present invention.

In order to make the apparatus more fully automatic, it can be combined in the form shown for example in FIG. 3. Here a set of rails 96, 98 are arranged to provide a trackway in the form of a closed loop having four legs 201, 202, 203 and 204. In each leg there are positioned a plurality of holding discs. Those in leg 201 are indicated respectively at 101, 102, 103, 104, 105, 106, 107 and 108. The discs in track leg 202 are correspondingly shown at 111, 112, 113, 114 and 115. Discs 121 to 128 inclusive are positioned in leg 203, while discs 131 to 135 inclusive occupy leg 204. At the counter-clockwise end of each leg there is provided a propelling or advancing mechanism shown as air cylinders 141, 142, 143 and 144. These cylinders have bars 146 that project into the end of the trackway and are arranged to be advanced by their cylinders longitudinally of the trackway. Vacancies are provided in two diagonally opposed corners, as indicated at 179, 180 for example, so that the discs can be advanced.

Automatic movement of the discs around the trackway is effected by suitably synchronized actuation of the advancing cylinders. In the illustrated position, cylinders 141 and 143 are actuated first, causing discs 101 to 108 inclusive to advance as one contiguous assembly, and discs 121 to 128 inclusive to advance as a second such assembly, one disc width in the clockwise direction. In the advanced position disc 108 fills the space 180 and becomes the rearmost disc in track 202. At the same time, the retraction of advancing rod 146 leaves a space where disc 101 used to be. At the same time the vacancy 179 has been transferred by operation of cylinder 143 to where disc 121 used to be. Cylinders 142 and 144 can then be actuated to complete an advancing cycle around the trackway, leaving it ready for the next cycle.

FIG. 3 schematically shows a loading unit 181 such as that illustrated in FIG. 1, positioned in trackway 201. A compacting unit 182 such as that of FIG. 2, is illustrated in track 202 along with a second loading unit 183. Further compacting and loading units are correspondingly shown at 184, 185 and 186. In the cycling of the holding discs they carry individual receptacles in a clockwise direction around the trackway and underneath the successive loading and compacting units. Where explosive material is being loaded, these units are preferably spaced apart from each other by distances sufficient to minimize the possibility of interaction in the event a detonation takes place. The apparatus of FIG. 3 shows a spacing arrangement suitable for loading three different types of explosive materials in successive layers in the same receptacle, the first load being the most easily detonated. Inasmuch as the greatest likelihood for detonation is in the compacting of the most easily detonated material, compacting unit 182 is spaced for apart from its adjoining units. Furthermore, the largest collection of easily detonated material is in the loading unit 181 so that this unit is placed somewhat further from unit 182 than the next loading unit 183 is.

As an additional precaution, the units can each be surrounded by a shield 190 of explosion-resistant material such as armor plate. For convenience the shield 190 can be split into segments fastened together by connection pins 191 fitted through overlapping hinge loops formed from or attached to the shield plates.

The holder discs can have individual receptacles such as tubes 88 inserted in their sockets either by hand or suitable automatic inserting equipment and then supplied by leg 204 for example to the leg 201. The discs should be accurately dimensioned so that every advancing step brings the individual discs of a contiguous line to the same series of positions. This is particularly important in leg 203 for example where three different operations are performed on the receptacles in portions of the leg. A small amount of variation in the disc diameter is permitted inasmuch as the funneling block will suitably feed the dropping particles even though the receptacles are somewhat out of place. Such feeding is even further facilitated by tapering the upper end of the sockets in which these receptacles are mounted, as indicated in FIG. 1. In addition to the above, the compacting units provide some self-aligning tolerance when the lower plunger is arranged to elevate before the upper plunger descends. However, the slight shifting effected by the lower plunger cannot readily take place in the backward direction (counterclockwise as seen in FIG. 3) unless the actuating bar at 146 is withdrawn beforehand.

After the individual receptacles complete the cycle of loading and compacting operations, they can be removed from the sockets as for example by an unloading unit 195.

This unit is shown as positioned in leg 204 in the construction of FIG. 3 and need only have a plunger that descends from above, similar to the upper plunger of the compacting units. By arranging the sockets 90 so that they are merely relatively loose frictional fits for their receptacles, these receptacles will be readily pushed out through the bottom of the sockets by the unloading unit 195 and can be carried as by a conveyor belt 197 to any desired location.

To insure that the receptacles are properly filled, the loading units can be adjusted to slightly over-fill them, and the excess fillant subsequently removed as by brushing from the top of the receptacle. Such brushing can be accomplished by a separate operation at a remote location, or can be performed on the apparatus of FIG. 3, as by providing an elevating plunger to lift the filled receptacles somewhat above the surface of the discs in which they are carried, and having a rotating brushing arrangement positioned to brush over the top of the lifted receptacles. This leveling adjustment can be provided between the last compactor 186 and the unloading unit 195.

The receptacles after loading can be left uncovered or they can be covered as by metal foil which can very readily be punched out and tamped down over the top of the receptacle. In fact the foil can be punched out right on the apparatus of FIG. 3 by a punching unit operating like the compacting unit but provided with a strip of foil and a step-by-step feeding arrangement to hold the foil above a punching out anvil below the plunger at each operation of the unit. A similar arrangement can be used to place such a foil at the bottom of the receptacles, before loading is begun.

Where the loading is used for detonators on small cannon shells, receptacles having a width of only about 3/32 of an inch and a height about 3/8 of an inch are very effectively loaded by the above apparatus, the receptacles themselves being made from tubes open at each end, with the lower opening closed on the machine by a foil of aluminum punched and inserted in the above manner. To help in the above insertion these extremely small tubes can have their lower end provided with an internal lip as indicated in FIG. 1 so as to hold the foil in place.

Other closure materials such as paper, resin or the like can be used for the receptacles, and in some cases the tops of the receptacles can merely be covered by a film of enamel or paint sprayed or brushed over the top of the fillant. Such spraying can be easily carried out by merely unloading the filled receptacles from the holder discs onto a carrier such as a wooden block that contains a series of sockets for a plurality of the receptacles. After the block is filled, it can be passed under a suitably directed spray. As a further modification of the present invention, receptacles such as detonators can be directly unloaded as by unloading unit 195 into the portion of the shell in which they are to be mounted. A series of such shell portions appropriately oriented can merely be advanced as by conveyor 197 in synchronism with the operation of unloading unit 195.

When the apparatus of the present invention is used for loading explosives, it is desirable to provide suction ducts opening at any location on the machine where some of the explosive material is apt to be spilled. The place at which brushing of excess fillant from the top of the receptacle takes place is such a location and the unloading site is usually another such location. The suction ducts can be connected through water traps to a suction blower to that explosive particles are trapped by the water and thereby rendered innocuous.

The machine of the present invention can also be operated in other ways. The holder discs 101, 102, etc., can by way of example have their lower flanges removed so that they merely rest on the trackway with depending portions fitted between the individual tracks. This simplifies the handling of the discs which can then be directly inserted and removed from between the tracks by merely lowering or lifting them from above. Such a modified arrangement would preferably have a hold-down plate at each of the compacting units where the lower plunger is connected to elevate before the upper plunger descends. The hold-down plates will then keep the entire disc from being raised by the elevating plunger.

Modification of the present invention can also be effected with more or less than three loading units as shown in FIG. 3. Similarly the compacting units can be omitted where such an operation is not necessary. Furthermore, any kind of receptacle can be filled regardless of how large or how much fillant is to go into it. If desired, the individual receptacle holders or discs can be provided with a supporting ledge upon which the individual receptacles are held, and the lower plungers then eliminated from the compacting units. The apparatus can also have two or more separate rows of receptacles simultaneously loaded on different track legs. One leg can, for example, be connected to receive, load, and discharge one series of receptacles while another leg does the same to a separate series. If the loading takes a multiplicity of separate operations, as in the combination of FIG. 1, the loading legs can be made longer and all these operations completed on a single straight length of track.

It is also desirable to have the receptacle advancing steps start and end slowly, with the intermediate portion of the step somewhat faster. This is readily provided by a cam-operated arrangement as described above in connection with FIG. 2.

A feature of the present invention is that the loading units can also be used with any other type of receptacle positioning device. Chain link conveyors, indexing rotors and even manual positioning can be substituted for the disc-and-track assembly of FIG. 3. The disc-and-track assembly can have rectangular or square discs rather than the circular ones shown in FIG. 3, although the circular discs provide a more open work space through which stray particles can more readily fall, and also provide minimum contact between holders (at the point where the discs engage) so that there is less likelihood of wedging explosive particles and detonating them.

Instead of shifting the discs in two steps with opposite legs moving simultaneously at each step, any other shifting arrangement can be used. By way of example, vacancies can be left at all corners and the four legs shifted simultaneously. In order to keep the advancing rods 146 from interfering with the advancing motion of the loading disc in the preceding leg, the rod can be reciprocated in a plane below the discs, with the connecting end of the rod bent upwardly to engage the disc it is pushing. In addition, the engagement with the discs can be shifted to a projection on the lower surface, preferably around their centers. The bent-up end of the advancing rods can also be yieldably pivoted so that upon retraction the advancing rod will be able to move past the disc that has been pushed in front of the one that it has engaged.

Figure 4:
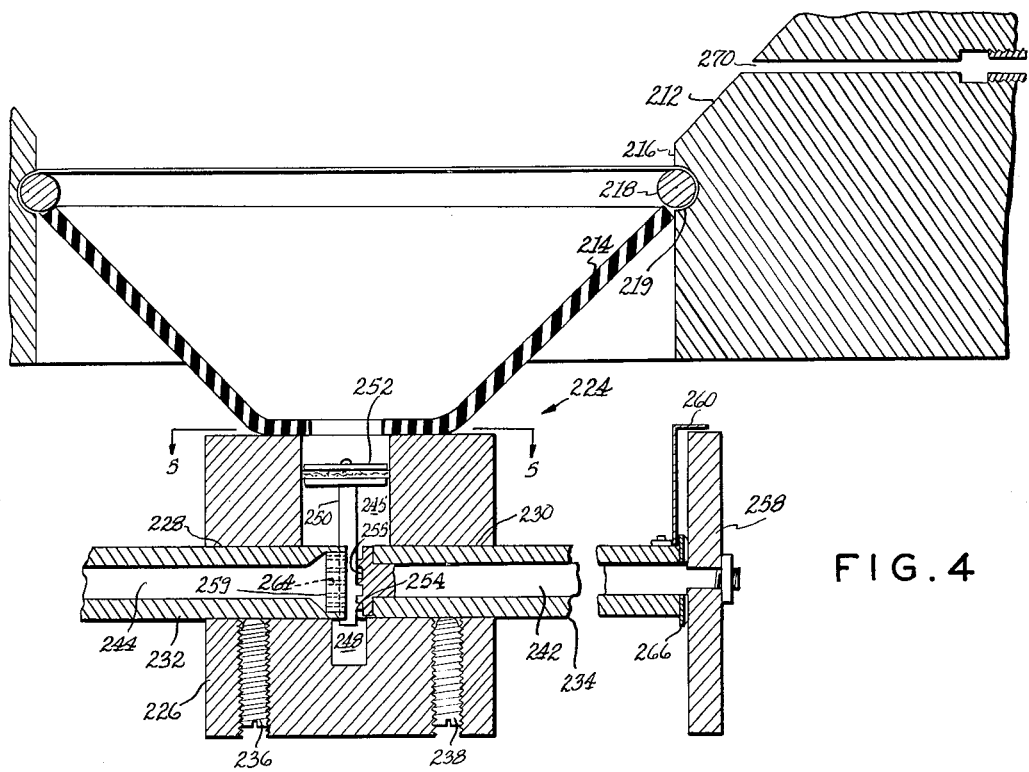
FIG. 4 is a fragmentary view similar to FIG. 1 of a modified form of loading unit according to the present invention.

FIG. 4 shows a modified arrangement for the loading units according to the present invention. In this arrangement the reservoir 212 has an untapered passageway 216 in which the rubbery bottom cup 214 is held. A resilient snap ring 218 of metal, for example, fitted in a suitably positioned groove 219 keeps cup 214 from moving upwardly, and a metering assembly 224 presses up to upwardly deform the bottom of the cup while at the same time it keeps the cup from moving downwardly.

In the construction of FIG. 4 the metering assembly has a generally cylindrical block 226 with opposed axial openings 228, 230. In these openings are fitted, as by pressing, stub shafts 232, 234. Set screws 236, 238 can be arranged to securely hold the stub shafts and the block 226 as an integral assembly. Stub shaft 232 is hollow, as indicated at 244, for the passage of air while stub shaft 234 is in the form of a sleeve through which a control rod 242 passes.

A metering pocket 245 has a reduced extension 248 that passes between the inner ends of the stub shafts. This space carries an elevating rod or pedestal 250 having a square or rectangular transverse section, and to the top of the rod is fastened a movable pocket floor 252. The rod also carries one or more teeth 254 that project out from one of its sides and engage a spiral groove 255 cut in the end of an enlarged end face of control rod 242. A drum or dial 258 suitably secured on the outer end of rod 242 provides manipulating means by which control rod 242 can be rotated. The periphery of dial 258 can be graduated and a pointer 260 can be suitably provided to cooperate with these graduations and indicate the rotary position of the rod with respect to the remainder of the metering assembly.

By rotating the dial 258, the spiral groove 255 is caused to raise or lower the rod 250 by way of its engagement with meshing teeth 254 and this serves to adjust the position of floor 252. In order to keep the teeth 254 in proper engagement, the rod 250 should be kept from rotating around its longitudinal axis as by providing the inner end of shaft 232 with a plug 259 having a vertically directed rectangular groove 260 in which rod 250 slidably fits. This plug 259 is also shown at 264 as perforated to provide a passageway for air. By spacing the inner ends of the stub shafts from each other as indicated at 256, the air passageway between the pocket and the hollow center 244 will be completed.

Figure 5:
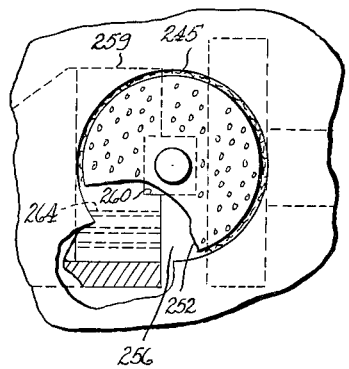
FIG. 5 is a partial sectional view of the construction of FIG. 4 taken along the line 5—5.

The movable floor 252 is illustrated in FIGS. 4 and 5 as two perforated metal plates with a felt washer sandwiched between them and secured as by a screw to the top of rod 250. Although the floor 252 is shown as circular in plan view, inasmuch as a circular pocket will be simpler to provide, the floor and pocket can have any other mating shapes and can even be square in plan view.

To keep dial 258 from inadvertent rotation with respect to sleeve 234, a friction engagement such as spring 266 can be inserted between them.

FIG. 4 also shows an air passageway 270 for a jet of air to help agitate the powder in the reservoir. As indicated above, a plurality of such passageways can be provided encircling the reservoir and the jets can be connected for operation when the pocket is in the filling position illustrated.

The cup 214 is preferably preformed for the larger sizes of reservoirs, as for example where the internal diameter of wall 216 is about two inches or more. For smaller diameters, the desired shape is readily provided from a flat disc that is merely forced into place.

Instead of using a flexible conduit such as line 46 to supply air to the rotating shaft, a fixed conduit with a rotating coupling can be used, particularly where the shaft is rotated in one direction rather than reciprocated. Furthermore, where reciprocation is used, it can also be provided by merely affixing a radially projecting arm on the shaft or on a gear meshing with a gear on the shaft, and then connecting the arm for reciprocation in a manner similar to the way the rack 38 of FIG. 1 is reciprocated.

The receptacles that are filled in accordance with the present invention need not be recessed in a holder but can just as easily be mounted to project up beyond or stand on the top of a holder, particularly where the receptacles are of such size and shape as to readily support themselves. Even where they are desired to be well supported by the carriers, they can merely be held in a block placed in a shallow recess on the top of the individual holders 101.

As many apparently widely different embodiments of this invention may be made without departing from the spirit and scope hereof, it is to be understood the invention is not limited to the specific embodiments hereof except as defined in the appended claims.

What is claimed is:

1. In a loading device for particulate material, a holder for the material, said holder having a resilient resinous cup-shaped bottom panel with an aperture at its lowest portion, said panel resiliently urging its apertured portion downwardly, a metering member having a smooth surface pressed upward against only the apertured portion of the bottom panel and deforming that portion upwardly against its resilient urging to provide a low friction seal for the aperture, said surface having a metering pocket and being in slidable engagement with the apertured surface, and actuating mechanism connected to rotate the pocketed surface and move the pocket under the aperture to receive some of the material from the holder, said mechanism being also connected to rotate the pocketed surface to slide the pocketed surface along the apertured portion so as to bring the pocket away from the aperture into position for emptying the received material into a desired receptacle.

2. The combination of claim 1 in which the pocket has a porous wall communicating with a controllable source of gas under a pressure other than atmospheric, and the actuating mechanism is further connected to control the source and apply the pressure to assist with the loading.

3. The combination of claim 2 in which the source is connected to selectably supply gas under superatmospheric and under subatmospheric pressure, and the actuating mechanism is connected to actuate the subatmospheric supply when the pocket is in the particle receiving position and to actuate the superatmospheric supply when the pocket is in the emptying position.

4. In a loading device for particulate material, a holder for the material, said holder having a cup-shaped rubbery bottom the lowest portion of which the cup-shaped bottom resiliently urges downwardly, a feed aperture in said lowest portion, a metering member rotatably mounted around a horizontal axis and having a surface of revolution pressed upward only against said bottom and deforming it upwardly against its resilient downward urging to form a low-friction seal for the aperture, said surface having a metering pocket, and actuating mechanism connected to rotate the member so as to bring the pocket under the aperture to receive some of the material from the holder, said mechanism being also connected to rotate the member so as to cause the pocketed surface to be wiped away from the aperture and bring the pocket into position for emptying the received material into a desired receptacle.

5. The combination of claim 4 in which the surface of revolution is cylindrical.

6. The combination of claim 4 in which the surface of revolution is spherical.

7. The combination of claim 4 in which the surface of revolution has a Rockwell hardness of C–35 or higher.

8. A method for loading very finely divided friction-sensitive explosive particles into receptacles, said method including the steps of pouring an excess of such particles into a metering pocket of a smooth-surfaced member, removing the surplus particles from above the pocket with a resilient resinous wiper having an apertured cup-shaped bottom only the lowest portion of which engages the smooth surface, and is deformed upwardly by it and emptying the remaining particles from the pocket.

9. The combination of claim 4 in which the metering member is rotatably mounted on a shaft journaled in side supporting means, and the journal structure is protected by rubber seals to keep particles from reaching the journal structure.

10. A stepping mechanism for sequentially advancing article holders to work stations, said mechanism including an endless track having four angularly connected legs, a series of article holding blocks slidably mounted in each leg of said track for advancing therein, each of said series filling its respective leg except for a one-block vacancy in at least alternate junctions between legs, advancing mechanism separately connected to the respective legs to first simultaneously advance those series having the vacancies at their advancing end to thereby move the vacancies to the following series, and to subsequently advance the following series.

11. A loading mechanism for explosive particles, said mechanism having a plurality of blocks slidably mounted in a trackway, each block having container-holding structure for carrying a container to be loaded, a loading station adjacent the trackway, said station having a supply of explosive powder and dispensing structure for introducing the powder into containers at a point in the trackway, and advancing mechanism connected to push against the blocks at a point in the trackway and thereby impel them along the trackway and cause the impelled blocks to contact and push before them a group of blocks that are ahead of them in the trackway, all said blocks being generally cylindrical so that they contact each other only along a very limited section of their peripheries.

12. In a loading device for introducing metered amounts of light explosive particles into narrow containers, a holder for the particles, said holder having a resilient resinous cup-shaped bottom panel with an aperture at its lowest portion, said panel resiliently urging its apertured portion downwardly, a metering member having a smooth surface pressed upward against only the apertured portion of the bottom panel and deforming that portion upwardly against its resilient downward urging to form an effective low-friction seal for the aperture, said surface having a metering pocket and being in slidable engagement with the apertured surface, actuating mechanism connected to rotate the pocketed surface and move the pocket under the aperture to receive some of the material from the holder; said mechanism being also connected to rotate the pocketed surface and slide the pocketed surface along the apertured portion so as to bring the pocket away from the aperture into position for emptying the received material into a desired receptacle, a funnel-shaped conduit at the emptying position to guide the emptied particles, support elements for holding one of the narrow containers in loading position below the funnel-shaped conduit, and vibrating structure connected to said funnel-shaped conduit to vibrate it when the particles are emptied.

13. A metering device for particulate material, said device including a rotatable member having a portion shaped as a surface of revolution with respect to the axis of rotation, a pocket in said surface, said pocket having a movable floor that is positioned at an adjustable depth, the rotatable member being mounted on a shaft coaxial with the axis of said surface of revolution, the shaft projecting from at least one side of the member and a position-adjusting mechanism connecting the movable floor with an actuator located at a projecting portion of the shaft to enable adjustment of the floor position by manipulation of the actuator.

14. A stepping mechanism for sequentially advancing a series of article holders to accurate locations at a plurality of successive work stations, said mechanism including an endless track having a succession of legs angularly connected to each other, a series of cylindrical article-holding blocks slidably mounted in each leg, the cylindrical surfaces of the blocks in each leg being in contact with the cylindrical surfaces of the other blocks in the same leg, some of the legs having a one-block vacancy, and advancing mechanism connected to advance the rearmost block of each series and cause these rearmost blocks to push the remaining blocks of the series along the individual legs to the next legs.

15. A stepping mechanism for sequentially advancing a series of fuse holders into loading position with respect to an explosive loading station, said mechanism including a track having a series of slidably mounted fuse holding blocks and advancing elements connected to stepwise advance the blocks along the track, said advancing elements being connected to begin and end each advancing step slowly and to conduct the intermediate portion of each step more rapidly.

16. The combination of claim 15 in which the blocks are cylindrical and have their cylindrical surfaces in contact with each other, and the advancing mechanism is connected to cause the blocks to push each other along the track.

17. In an automatic ammunition loading apparatus, a track, a series of work-holding blocks slidably mounted on said track, an explosive loading station at one portion of said track, a compacting station at another portion of said track, advancing mechanism connected to stepwise advance said blocks along said track to bring the work they carry to the loading station and then to the compacting station, said compacting station including a tamping device connected for reciprocation into and out of the work, and the tamping device including reciprocating drive elements that cause the tamping device to begin and end the tamping step at a slower rate than the intervening portion of the tamping step.

18. The combination of claim 17 in which the blocks are cylindrical and have their cylindrical surfaces in contact with each other, and the advancing mechanism is connected to cause the blocks to push each other along the track.

19. The combination of claim 18 in which the advancing mechanism is connected to begin and end each advancing step slowly, and to conduct the intermediate portion of each advancing step more rapidly.

References Cited by the Examiner

UNITED STATES PATENTS

| | | | |
|---|---|---|---|
| 506,357 | 10/1893 | Board | 86—20 |
| 1,054,459 | 2/1913 | Schwartz et al. | |
| 1,738,039 | 12/1929 | Cope et al. | 263—6 |
| 2,227,145 | 12/1940 | Lex et al. | 198—19 |
| 2,277,309 | 3/1942 | Doll | 198—19 |
| 2,331,587 | 10/1943 | Williams | 86—29 |
| 2,345,885 | 4/1944 | Reynolds | 86—31 |
| 2,390,691 | 12/1945 | Christie | 86—31 |
| 2,392,169 | 1/1946 | Mansfield | 29—33.12 |
| 2,424,675 | 7/1947 | Wood | 222—368 |
| 2,540,059 | 1/1951 | Stirn et al. | 222—368 |
| 2,670,101 | 2/1954 | Heisterkamp et al. | 222—194 X |

FOREIGN PATENTS 646,817 11/1950 Great Britain.

BENJAMIN A. BORCHELT, *Primary Examiner.*

SAMUEL BOYD, ARTHUR M. HORTON, SAMUEL FEINBERG, *Examiners.*